Nov. 22, 1960     G. W. DIDION     2,961,112
MILK BOTTLE HOLDER
Filed Aug. 5, 1959
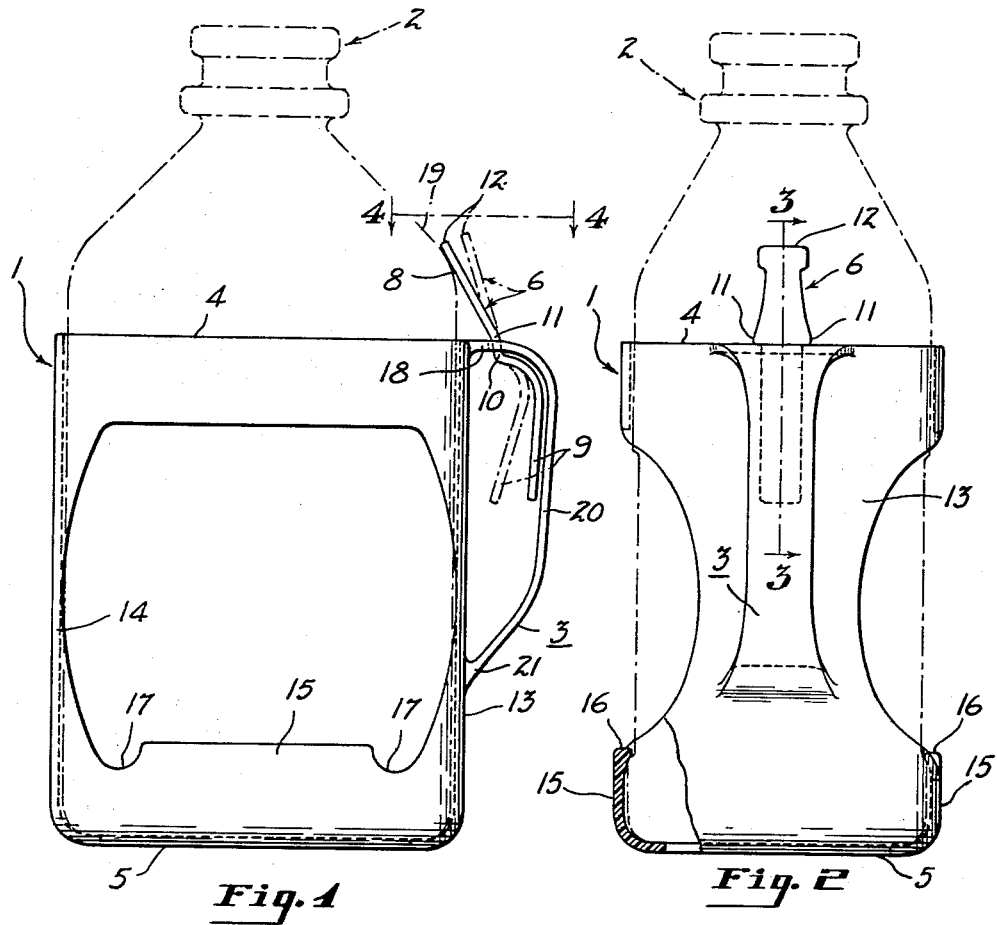
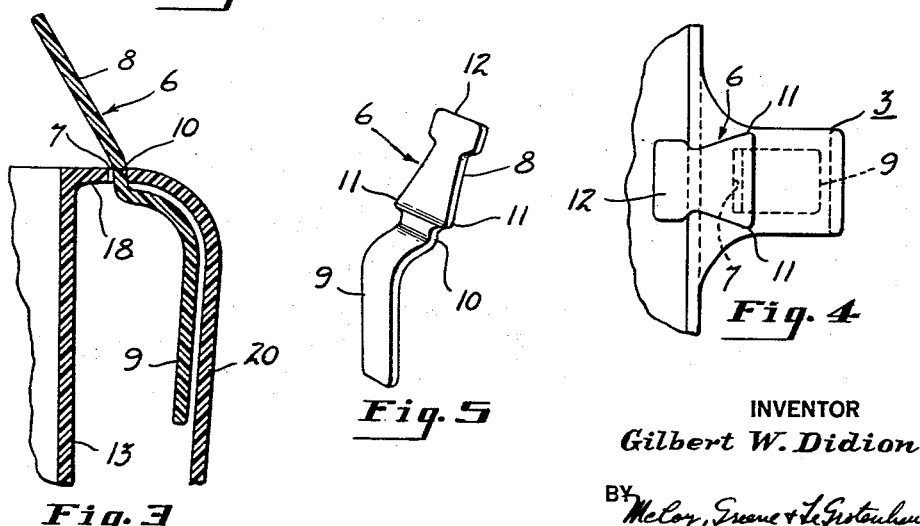
INVENTOR
Gilbert W. Didion
ATTORNEYS

United States Patent Office 2,961,112
Patented Nov. 22, 1960

2,961,112

MILK BOTTLE HOLDER

Gilbert W. Didion, Sandusky, Ohio, assignor to Evlo Plastics, Inc., Sandusky, Ohio, a corporation of Ohio Filed Aug. 5, 1959, Ser. No. 831,808

2 Claims. (Cl. 215—100)

The present invention relates to a holder for glass milk bottles and similar containers.

In the dairy industry and certain other food produce industries the use of a single relatively large container in place of several smaller containers has become commonplace because of the economies effected thereby. For instance, milk is now generally sold in two-quart or half-gallon containers.

One of the disadvantages of this practice is the fact that the larger containers are difficult and cumbersome to pour and handle because they are relatively heavy and hard to grip.

The object of the present invention is to provide a holder for containers such as two-quart milk bottles which facilitates pouring and handling them.

This and other objects and advantages of the present invention will become apparent from the following description of the invention and reference to the drawings in which like numerals relate to like parts. In the drawings, Figure 1 is a side view of a holder of the present invention with a two-quart milk bottle being shown in dot-dash line.

Figure 2 is an end view similar to Figure 1 with the lower portion broken away and shown in cross-section.

Figure 3 is an enlarged cross-sectional view showing a detail of the clamp or pressure lock member mounted in the handle of the holder.

Figure 4 is a plan view of the detail of Figure 3, and

Figure 5 is a perspective view of the clamp.

In accordance with the present invention, a holder 1 is molded of resilient plastic material, such as high density polyethylene, to accommodate a specific container such as a two-quart milk bottle 2. The holder comprises a handle 3, a top portion 4, a bottom portion 5, and integral side portions 13 and 14 connecting the top and bottom portions and spacing them apart to form a single unitary structure. The top portion and bottom portion have the same cross-sectional shape as that of the bottle. The base of the holder is provided with certain pressure locks 16 to help grip the base of the bottle and the handle 3 of the holder is provided with a mechanical pressure lock 6 which firmly grips and positions the top of the bottle when the container is in the pouring position. By these means, the bottle is readily held and handled.

The top portion 18 of the handle 3 is molded integrally with the top portion 4 of the holder. The bottom portion 21 of the handle is likewise molded integrally with the side 13 of the handle, although it could just as well extend down to the bottom portion or have no connection with the holder body. A slot 7 is provided in the top portion of the handle spaced slightly out from the top portion of the holder. Positioned in the slot is a clamp or pressure lock member 6. The head 12 on the upper portion 8 of this member is adapted to press against the shoulder portion 19 of the milk bottle when the lower portion 9 of the clamp is positioned against the inner surface of the central or middle portion 20 of the handle.

The clamp is provided with positioning ears 11 which prevent it from dropping through the slot 7 and which serve to define the path about which the clamp pivots. In Fig. 1 the clamp is shown in solid line in the bottle-engaging position and in dot-dash line in the free position. As is apparent, anyone gripping the handle will necessarily force the lower portion of the clamp against the handle portion 20 and force the clamp head 12 against the shoulder or upper portion 19 of the milk bottle to firmly position it in the holder. The neck 10 of the clamp is adapted to fit through the slot 7 for easy insertion into the operating position. The lower portion or handle-engaging portion of the clamp 9 has the same width of the slot 7 or a slightly smaller width, and in side view has the same shape or configuration as the inner surface of the handle portion 20. The clamp 6 may be stamped from metal or molded out of a relatively strong and rigid plastic material.

The side walls 15 of the bottom portion 5 of the holder are provided with beads or molded-in pressure locks 16. These exert an inward gripping force on the sides of the milk bottle, the holder being molded and designed so that it is sprung slightly when a bottle is placed therein. In other words the beads 16 are sprung slightly outwardly when the milk bottle is initially placed into the holder and then overlap the bottom projection of the bottle and grip it as shown. The bottom portion 5 may be open as shown in Fig. 2 or solid so that it retains any liquid drippings from the container.

It is possible to hold the milk bottle adequately through the clamp 6 without supplementary gripping means, but it is preferable to have a tight fit at the base of the container or supplementary gripping means as shown.

In addition to milk bottles, the holder of the present invention may be adapted to any container which is sufficiently rigid for the purposes thereof.

Having thus described my invention, what I claim is:

1. A holder for containers such as glass milk bottles and the like comprising top and bottom portions having the same cross-sectional shape as the cross-sectional shape of the container, integral side portions spacing said top and bottom portions apart and forming a single unitary structure, a handle integral with the top portion of the holder, said handle having at least a top portion and central portion, a slot in the top portion of said handle spaced slightly outwardly from the top portion of the holder, a clamp disposed in said slot so that the upper portion of said clamp presses against the shoulder portion of the container when the lower portion of said clamp is positioned adjacent the central portion of the handle, said clamp being provided with ears which coact with the top portion of the handle adjacent the slot therein and serve to define the path about which said clamp pivots.

2. The holder of claim 1 in which there are only two side portions and the upper edges of the bottom portion are provided with beaded portions adapted to spring over and grip the bottom portion of the container.

References Cited in the file of this patent

UNITED STATES PATENTS

| | | |
|---|---|---|
| 1,001,628 | Erichsen | Aug. 29, 1911 |
| 2,116,148 | Hawley | May 3, 1938 |
| 2,810,503 | Krueger | Oct. 22, 1957 |